United States Patent [19]

Mori

[11] Patent Number: 5,123,714
[45] Date of Patent: Jun. 23, 1992

[54] ANTISKID APPARATUS

[75] Inventor: Akihiko Mori, Himeji, Japan

[73] Assignee: Mitsubishi Denki K.K., Tokyo, Japan

[21] Appl. No.: 647,968

[22] Filed: Jan. 30, 1991

[30] Foreign Application Priority Data

Feb. 8, 1990 [JP] Japan .................................. 2-30252

[51] Int. Cl.⁵ .............................................. B60T 8/70
[52] U.S. Cl. ..................................... 303/103; 303/97
[58] Field of Search ................ 303/100, 103, 107, 109; 364/426.2

[56] References Cited

U.S. PATENT DOCUMENTS

| | | | |
|---|---|---|---|
| 3,716,273 | 2/1973 | Beyerlein | 303/97 |
| 3,827,760 | 8/1974 | Fleagle | 303/106 |
| 3,843,207 | 10/1974 | Syria | 303/97 |
| 3,856,365 | 12/1974 | Steigerwald et al. | 303/93 |
| 3,993,362 | 11/1976 | Kamins et al. | 303/103 |
| 5,012,417 | 10/1991 | Watanabe et al. | 303/103 |

FOREIGN PATENT DOCUMENTS 61-28541 7/1986 Japan.
222269 9/1988 Japan.

*Primary Examiner*—Matthew C. Graham
*Attorney, Agent, or Firm*—Sughrue, Mion, Zinn, Macpeak & Seas

[57] ABSTRACT

An antiskid apparatus including a first filter circuit having a predetermined cut-off frequency and a second filter circuit having a variable cut-off frequency, each of which filter the speed of a vehicle wheel. The output of the first filter circuit is applied to a deceleration detecting circuit, a vehicle speed detecting circuit, and a slip quantity calculating circuit for respectively calculating the deceleration of the vehicle wheel, the estimated vehicle speed, and a slip quantity of the vehicle wheel with respect to the vehicle speed. In response to the first wheel deceleration signal and the slip quantity signal, a cut-off frequency changing circuit alters the cut-off frequency of the second filter circuit, whose output is applied to a second wheel deceleration detecting circuit. As a result, a control quantity calculating circuit, in response to the outputs of the first and second wheel deceleratioin detecting circuits, or an output of the slip quantity calculating circuit, can determine an amount of braking pressure increase or decrease to avoid wheel locking.

3 Claims, 5 Drawing Sheets

ANTISKID APPARATUS

BACKGROUND OF THE INVENTION

1. Field of the Invention

The present invention relates to an antiskid apparatus capable of avoiding a lock state of a wheel of an automobile wherein, a braking pressure is reduced when the wheel is about to enter a lock state at the time of the application of a braking force to the wheel, the braking pressure is returned when the revolution speed of the wheel is returned to the original speed by the reduction of pressure, and the above-mentioned operations are repeated.

2. Discussion of Background

There has been proposed antiskid apparatuses of this kind as shown in, for instance, Japanese Examined Patent Publication No. 28541/1986.

FIG. 5 is a diagram showing the operation for preventing a skid. In FIG. 5, a reference numeral 101 represents a wheel speed, numeral 102 indicates an actual vehicle body speed, numeral 103 designates a vehicle body speed which contains a slip factor of x %, a numeral 104 represents a deceleration of the wheel speed (hereinbelow, referred to as a deceleration) and numeral 105 indicates a braking pressure.

As is clear from FIG. 5, the operations for avoiding the antiskid in the conventional antiskid apparatus are carried out as follows. When the wheel deceleration 104 decreases to a predetermined value α 1 or lower, the braking pressure 105 is once maintained (during the time t1-the time t2). When an amount of slip of the wheel increases, a pressure reducing operation is started (at the time t2). The pressure reducing operation continues until the time point t3 when the deceleration 104 exceeds a predetermined value α1. Namely, the initiation of the pressure reduction is effected in accordance with the logical product of the deceleration and the slip factor, and the termination of the pressure reduction only relys on the deceleration.

As another conventional antiskid apparatus, there is a proposal as shown in Japanese Examined Patent Publication 222269/1988. In the antiskid apparatus, a wheel acceleration $V_{w(n)}$ is calculated with use of a digital filter in which calculations as in the following formula are conducted;

$$V_{w(n)} = \sum_{\mu=0}^{M} a\mu \cdot V \times (n - \mu) - \sum_{\gamma=1}^{N} b\gamma \cdot V_w(n - \gamma)$$

where $V_{x(n)}$: instantaneous acceleration, and $a\mu$, $b\gamma$: digital filter coefficients. In this formula, the digital filter coefficients $a\mu$, $b\gamma$ are respectively determined so as to depend on the wheel speed.

The conventional antiskid apparatus having the construction as described above has a noise removing function. Namely, it is required to remove noise components since a wheel speed signal contains various high frequency noise components. In the conventional antiskid apparatus, therefore, the noise components were removed by using an AND circuit in which the logical product of the wheel deceleration and the slip factor is used, or by using a digital filter to treat the wheel deceleration.

In the conventional antiskid apparatus, however, since the noise removing treatment was carried out without considering the friction between the tire of the wheel and a road surface conditions of which changes from time to time during the breaking operation to the vehicle, the following problem arised. Namely, when the brake control performance is set on a low friction side Lμ, an excessive reduction of brake pressure was found when the vehicle is in a high friction state Hμ, and when the brake control performance is sifted to the high friction side Hμ, the pressure reduction quantity was too small to thereby cause a large slip.

SUMMARY OF THE INVENTION

It is an object of the present invention to provide an antiskid apparatus capable of controlling a braking force suitable for conditions of a road surface μ.

The foregoing and other objects of the present invention have been attained by providing an antiskid apparatus which comprises a wheel speed detecting means for detecting a speed of at least one wheel, a first filter circuit having a predetermined cut-off frequency with respect to the wheel speed, a first wheel deceleration detecting means for detecting a first wheel deceleration as a wheel acceleration/deceleration after having been passed through the first filter circuit, a vehicle body speed estimating means for estimating a vehicle body speed on the basis of a wheel speed information which is obtained by having the wheel speed passed through the first filter circuit, a slip quantity calculating means for calculating a slip quantity on the basis of the vehicle body speed and the wheel speed information, a second filter circuit having a cut-off frequency which is variable with respect to the wheel speed, a second wheel deceleration detecting means for detecting a second wheel deceleration as a wheel acceleration/deceleration after having been passed through the second filter circuit, a cut-off frequency changing means for changing the cut-off frequency of the second filter circuit in accordance with a state of road surface μ by estimating the state of road surface μ on the basis of the first wheel deceleration and the slip quantity, a control quantity calculating means for performing the control of a pressure reduction quantity by adjusting a braking force at the time of detecting the wheel being locked on the basis of the logical product of the first and second wheel decelerations or the slip quantity, and for increasing the pressure of the braking force when the wheel speed is restored, and a braking force adjusting means for increasing or decreasing the braking force to the wheel in accordance with a pressure increasing/decreasing signal outputted from the control quantity calculating means.

In accordance with the present invention, the cut-off frequency of the second filter circuit is changed depending on the conditions of a road surface μ, and the control quantity calculating means determines the initiation or termination of reducing the break pressure by using the second wheel deceleration which is obtained by passing the wheel speed signal through the second filter circuit and the first wheel deceleration which is obtained by passing the wheel speed signal through the first filter. Accordingly, the stopping of the pressure reducing operation is effected sooner when the road surface is in a high friction state Hμ and the pressure reduction is kept longer when the road surface is in a low friction state Lμ. Accordingly, a change of the braking force is made small in the high friction state and the locking of the wheel can be avoided in the low friction state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
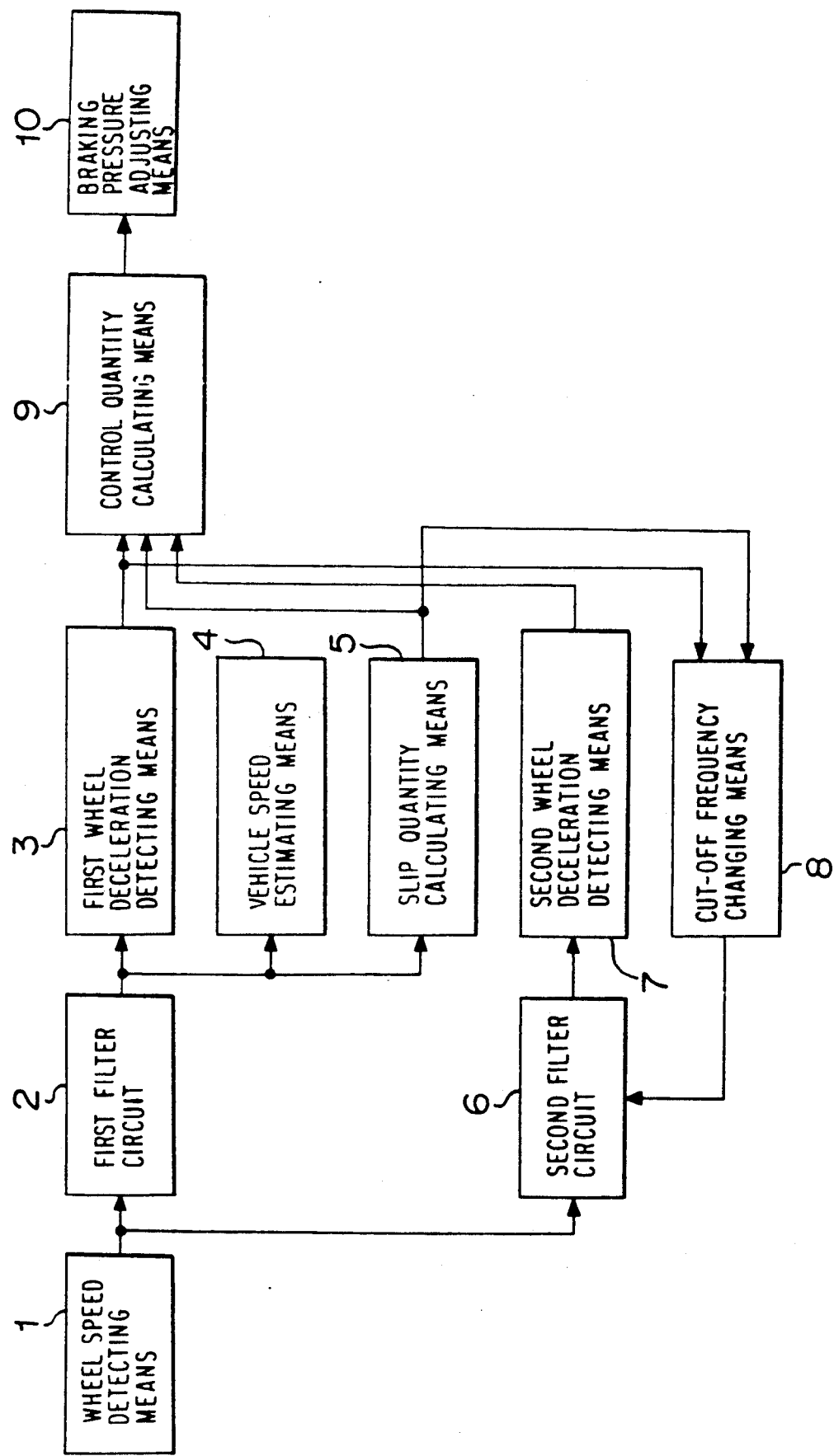
FIG. 1 is a block diagram of an embodiment of the antiskid apparatus according to the present invention.

Referring to the drawings wherein the same reference numerals designate the same or corresponding parts, and more particularly to FIG. 1, there is shown a block diagram of an embodiment of the antiskid apparatus according to the present invention.

In FIG. 1, reference numeral 1 designates a wheel speed detecting means, numeral 2 designates a first filter circuit having a predetermined cut-off frequency with respect to a wheel speed detected by the wheel speed detecting means, numeral 3 designates a first wheel deceleration detecting means which detects an acceleration or deceleration in the wheel speed which has been passed through the first filter circuit 2, numeral 4 designates a vehicle body speed estimating means which estimates a vehicle body speed on the basis of a wheel speed information which is provided from the first filter circuit 2, numeral 5 designates a slip quantity calculating means which calculates a slip quantity on the basis of the vehicle body speed obtained by the vehicle speed estimating means 4 and the wheel speed, numeral 6 designates a second filter circuit having a cut-off frequency which is changeable, numeral 7 designates a second wheel deceleration detecting means which detects an acceleration or deceleration in the wheel speed after the wheel speed passes through the filter circuit 6, and numeral 8 designates a cut-off frequency changing means which receives the output of the first wheel deceleration detecting means 3 and the output of the slip quantity calculating means 5 and which estimates a state of road surface μ on the basis of the wheel acceleration /deceleration and the slip quantity whereby the cut-off frequency of the second filter circuit 6 is changed on the basis of information of the road surface μ.

Reference numeral 9 designates a control quantity calculating means which receives the outputs of the first and second wheel deceleration detecting means 3 and 7 and the slip quantity calculating means 5, and outputs a signal instructing the reduction of the breaking force in accordance with the logical product of the first and second wheel decelerations or the slip quantity, and numeral 10 designates a braking pressure adjusting means for increasing or decreasing the braking pressure for the wheel in accordance with the signal of the control quantity calculating means 9.

The construction of the embodiment of the antiskid apparatus will be described in more detail.

Figure 2:
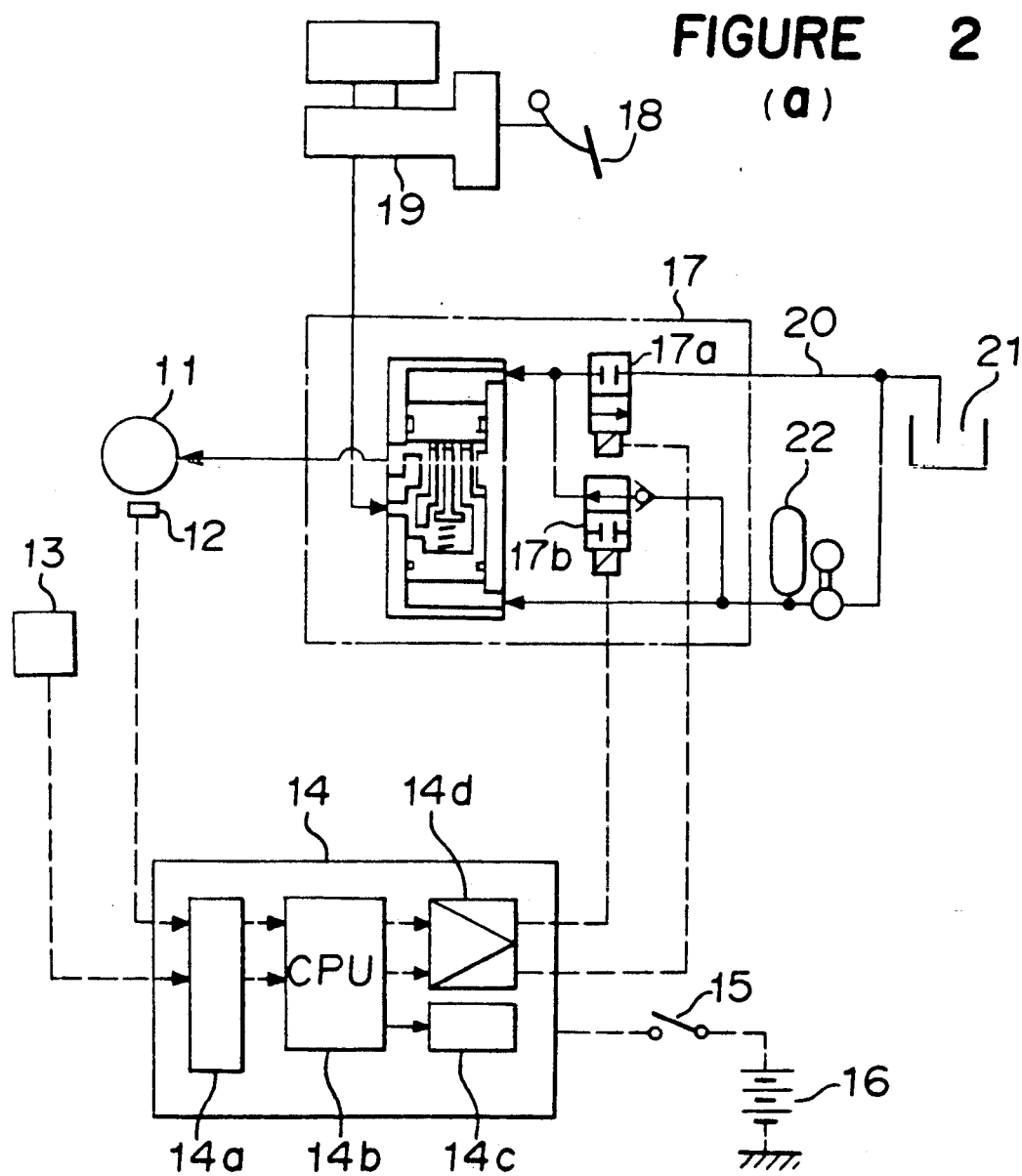
FIG. 2a is a block diagram showing the construction of the antiskid apparatus as shown in FIG. 1.
FIG. 2b is a enlarged view showing an embodiment of an actuator for adjusting the braking force of the antiskid apparatus shown in FIG. 1.
Figure 2:
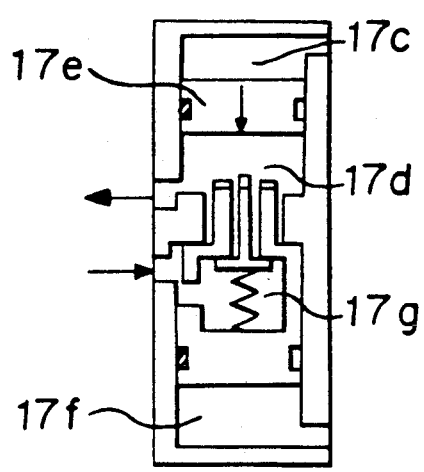

FIG. 2a is a block diagram showing schematically the construction of the apparatus. Description will be made as to only one wheel in order to simplify explanation.

In FIG. 2a, reference numeral 11 designates a wheel brake, numeral 12 designates a wheel speed sensor as the wheel speed detecting means 1 described above, which is disposed at the wheel, and numeral 13 designates an acceleration sensor (a G sensor) to detect a vehicle body deceleration. The G sensor is composed of, for instance, a differential transformer.

The control circuit 14 is so constructed that it receives power from a battery 16 through a power source switch 15; it receives at its input circuit 14a each signal from the wheel speed sensor 12 and the G sensor 13 so that these signals are processed in a central processing unit 14b using a microcomputer with the aid of a memory 14c in which command programs are stored; and it outputs a result of operation to an output circuit 14d.

Reference numeral 17 designates an actuator for adjusting a braking force, which corresponds to the braking pressure adjusting means 10. The actuator 17 is to control a braking pressure given by a master cylinder 19 which produces a braking pressure in association with a brake pedal 18. Numerals 17a, 17b are respectively a pressure reducing solenoid and a folding solenoid each being controlled by the control circuit 14.

FIG. 2b shows the internal structure of the actuator wherein numerals 17c, 17d designate respectively chambers defined by a piston 17e and numeral 17f designates a chamber defined by a cut valve 17g.

Reference numeral 20 designates a conduit connecting the pressure reducing solenoid 17a to a reservoir 21 and numeral 22 designates a pressure storage device.

The operation of the antiskid apparatus having the above-mentioned construction will be described. Usually, the chambers 17c, 17f of the actuator for adjusting braking force are maintained to have the same pressure, and the cut valve 17g is rendered to be in an open state by the pushing force of the piston 17e.

When a pressure reducing signal is outputted from the control circuit 14 in an antiskid condition, both the pressure reducing solenoid 17a and the folding solenoid 17b are driven, whereby a pressure in the chamber 17c is released to the reservoir 21 through the conduit 20. As a result, the piston 17e is moved toward the chamber 17c (the upper direction in the drawing). Then, the cut valve 17g is closed to interrupt between the master pressure and the wheel pressure, and the volume of the chamber 17d is increased so that the braking pressure is reduced.

When the control circuit 14 outputs a holding signal, the pressure reducing solenoid 17a enters a non-operating state and only the holding solenoid 17b is driven. As a result, the movement of the piston 17e is stopped and the braking force is maintained.

When the control circuit 14 outputs a pressure increasing signal, both the solenoids 17a, 17b enter a non-operating state. Accordingly, a pump motor which always maintains a high pressure and the pressure storage device 22 which constitutes a dynamic power source, introduce pressure into the chamber 17c. Then, the piston 17e is moved toward the chamber 17d (the lower direction in the drawing) whereby the volume of the chamber 17d is decreased to thereby increase the braking force.

Thus, by repeating the pressure reduction, the pressure holding and the pressure increase in accordance with instruction signals from the control circuit 14, there is obtainable a braking force adjusting function to thereby prevent the wheel from locking.

Figure 3:
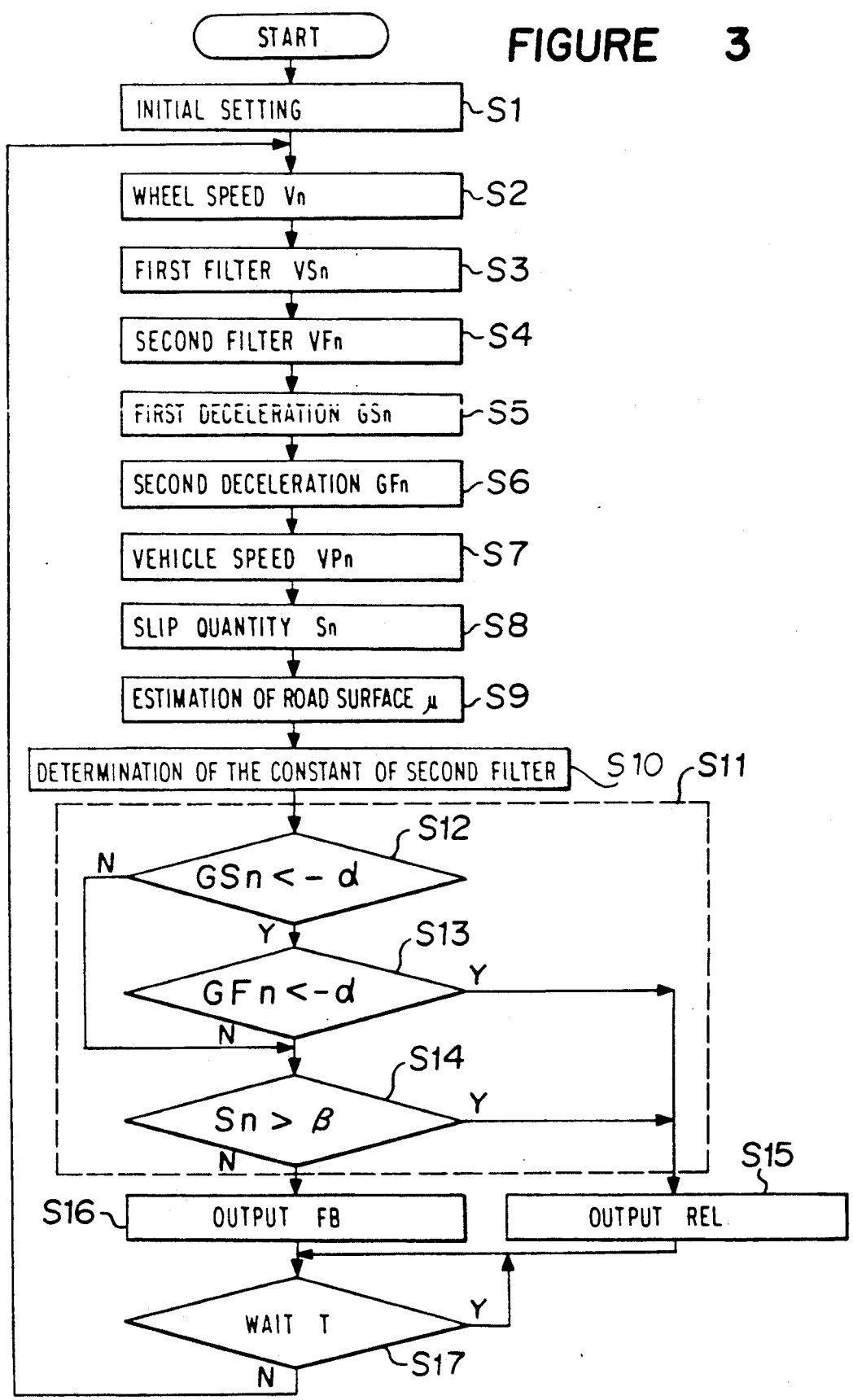
FIG. 3 is a flow chart showing control operations of the antiskid apparatus of the present invention.

The operation of the microcomputer 14b in the control circuit 14 will be described with reference to a flow chart in FIG. 3.

On starting, initial setting for each RAM and outputs and so on are carried out at Step S1, and a wheel speed Vn is calculated at Step S2. As an example of the method of calculating the wheel speed, there is a periodic measuring method using a formula:

$$V_n = K \frac{P_n - 1}{t_n - t_1}$$

Where $P_n$: the number of the pulses in a wheel speed signal inputted within a predetermined period, $t_1$: the time of inputting the first pulse after the starting of the measurement, tn: the time of inputting the last pulse, and K: a constant.

At Step S3, the wheel speed Vn is passed through the fist filter having a predetermined cut-off frequency. For simplifying the calculation, a first order filter is used. Then, a solution can be obtained by a formula:

$$V_{sn} = V_{sn-1} - L(V_n - V_{sn-1})$$

where $V_{sn-1}$ is a wheel speed obtained in the control period of the last time and L is a filter coefficient. In this calculation, the cut-off frequency is determined to be, for instance, 6 Hz.

At Step S4, the calculation at the second filter having a changeable cut-off frequency is carried out by using the following formula:

$$V_{Fn} = V_{Fn-1} - A(V_n - V_{Fn-1})$$

where $A \geq L$ and A is a coefficient corresponding to the cut-off frequency.

At Step S5, an acceleration/deceleration of the wheel speed obtained at Step S3, is obtained. For performing the calculation, the following formula is used:

$$G_{sn} = M \frac{V_{sn} - V_{sn-1}}{T}$$

where T is a control period of the microcomputer.

In the formula, $G_{sn}<0$ represents a deceleration, $G_{sn}>0$ represents an acceleration, and M is a constant.

At Step S6, the acceleration/deceleration of the wheel speed obtained at Step S4, is obtained by using a formula:

$$G_{Fn} = M \frac{V_{Fn} - V_{Fn-1}}{T}$$

At Step S7, a vehicle body speed $V_{pn}$ is calculated. In the calculation of the formula, a higher value between a value obtained by decreasing the wheel speed $V_{sn}$ at a predetermined rate and the wheel speed $V_{sn}$, is selected. Further, there is a method of calculation wherein the decreasing rate is changed depending on a state of road surface $\mu$.

At Step S8, a slip quantity $S_n$ is calculated on the basis of the difference between the vehicle body speed $V_{pn}$ and the wheel speed $V_{sn}$.

At Step S9, the state of road surface $\mu$ is estimated. The estimation of the state of road surface $\mu$ is made by utilizing the fact that when the magnitude and the producing time of the wheel acceleration/deceleration and the magnitude and the producing time of the slip quantity $S_n$ are obtained, there are s short generation time and a large wheel acceleration in a high friction state, and there are a long generating time and a large slip quantity $S_n$ in a low friction state.

At Step S10, the constant A of the second filter is changed depending on the state of the road surface $\mu$ in such a manner that when the state of road surface is H$\mu$, A=2L, and when the state is L$\mu$, A=1.5 L. When the cut-off frequency of L is 6 Hz, changes of the cut-off frequency to 12 Hz, for H$\mu$ and 9 Hz for L$\mu$ are possible.

At Step S11, determination is made as to whether the braking force should be increased or decreased on the basis of the wheel acceleration/deceleration values $G_{sn}$, $G_{Fn}$ and the slip quantity $S_n$. Specifically, $G_{sn}<-\alpha$ (where $\alpha$ is a threshold value which may be a variable or a constant depending on the state of road surface $\mu$) is examined at Step S12.

At Step S13, $G_{Fn}<-\alpha$ is also examined. At Step S14, $S_n>\beta$ (where $\beta$ is a threshold value and a constant) is examined. As the conditions of the pressure reduction, there are $G_{sn}<-\alpha$ (Step S12) and $G_{Fn}<-\alpha$ (Step S13) or $S_n>\beta$ (Step S14). Namely, the instruction of pressure reduction is provided when the wheel deceleration values each having passed through the filters are large or the slip quantity is large. When the above-mentioned conditions are satisfied, Step S15 is taken. Otherwise, the pressure of the braking force is increased (FB output) at Step S16. At Step S15, a pressure reducing signal is outputted. On the other hand, the pressure increasing signal is outputted at Step S16. Such signal is an output signal repeating pressure increase and pressure holding to the braking force with a predetermined relationship.

At Step S17, the operation is delayed until the control period T of the microcomputer passes. After the time T has lapsed, the sequential step is returned to Step S2 and the above-mentioned steps are executed in the same order.

Figure 4:
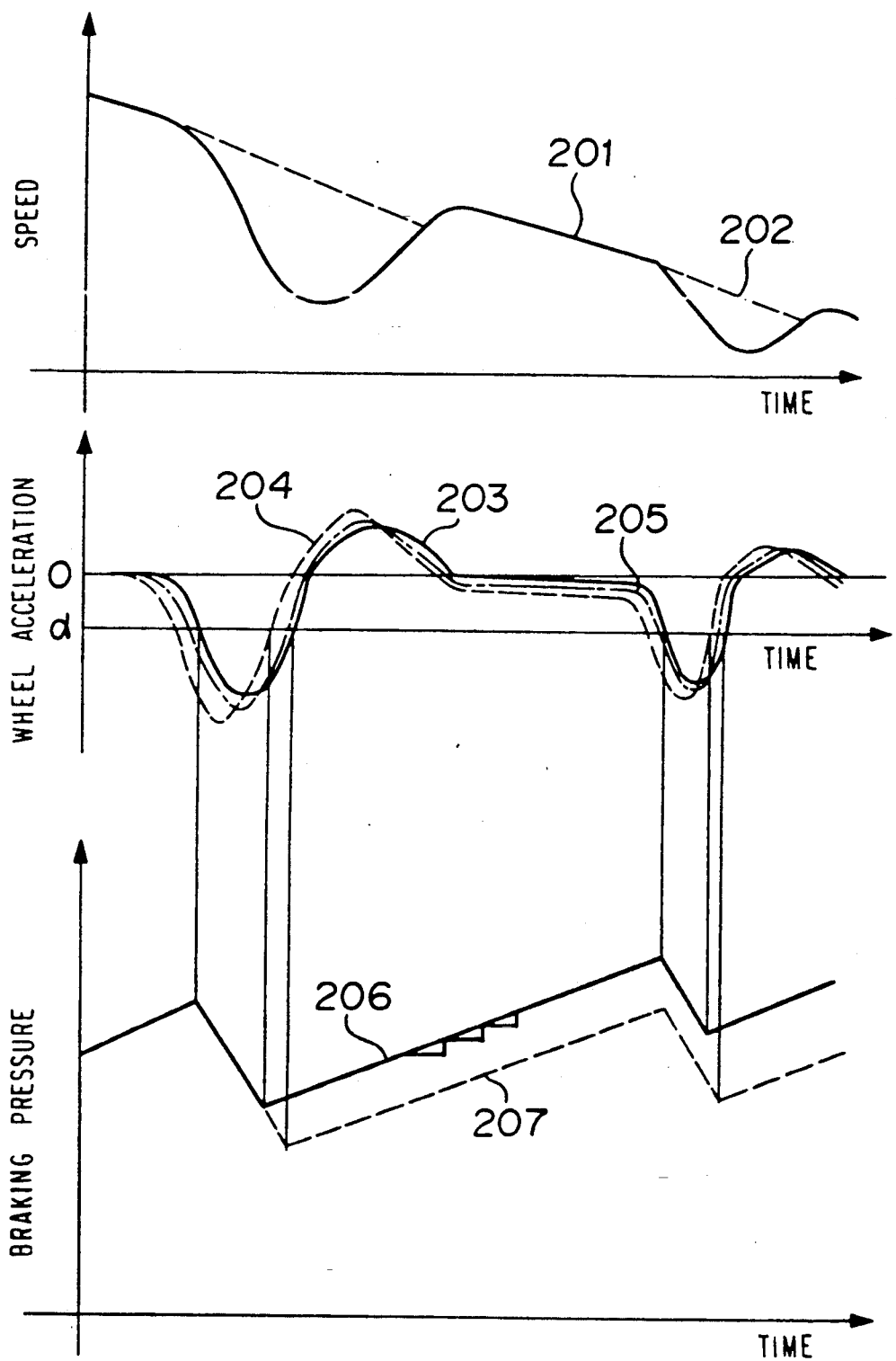
FIG. 4 is a diagram showing the operation of the antiskid apparatus of the present invention.
Figure 5:
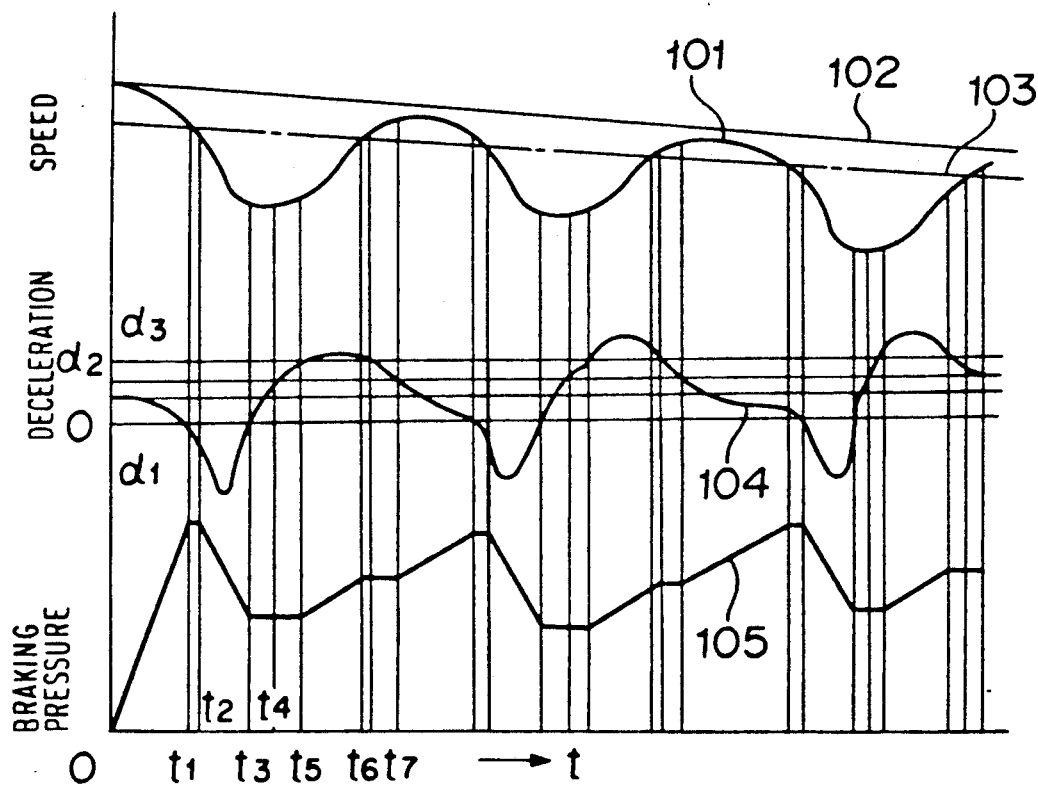
FIG. 5 is a diagram showing the operations to prevent a skid by a conventional antiskid apparatus.

In the next place, description will be made referring to FIG. 4 which concerns a case that the above-mentioned operations are conducted with respect to a vehicle.

When the wheel speed changes as indicated by a solid line 201, the vehicle body speed is indicated by a broken line 202. The wheel acceleration/deceleration, after the wheel speed has been passed through the first filter circuit having a predetermined cut-off frequency, assumes a state as indicated by a solid line 203. The wheel acceleration/deceleration under the condition that the road surface $\mu$ is in a state of H$\mu$ is shown by a broken line 204 while when the road surface $\mu$ is L$\mu$, it is shown by a one-chain line 205. The phase of the waveform of the wheel acceleration/deceleration of the vehicle on the road surface having a high friction, the wheel acceleration/deceleration being obtained by passing through the second filter having a changeable cut-off frequency, is more or less advancing with respect to the phase of the wheel acceleration/deceleration under a low frequency road surface condition.

With respect to the braking pressure, the pressure reducing conditions are produced when a deceleration has a predetermined value in the first and second filters. Accordingly, the braking pressure under Hμ is represented by a solid line 206 and that under Lμ represented by a broken line 207. Namely, the termination of the pressure reduction under Hμ is sooner, while the pressure reducing operation is kept longer under Lμ. The waveform of the braking pressure during pressure increasing operations assumes a step-like form as partly indicated by a solid line.

Thus, in accordance with the present invention, the braking pressure control quantity is calculated by using the output signal of the second filter having a cut-off frequency which is changeable depending on a state of road surface μ. Accordingly, a proper control of reducing the braking pressure can be performed even though the state of road surface μ changes.

Obviously, numerous modifications and variations of the present invention are possible in light of the above teachings. It is therefore to be understood that within the scope of the appended claims, the invention may be practiced otherwise than as specifically described herein.

What is claimed is:

1. An antiskid apparatus comprising:
   a wheel speed detecting means for detecting a wheel speed of at least one wheel,
   a first filter circuit having a predetermined cut-off frequency with respect to said wheel speed for filtering said wheel speed and producing a first filtered wheel speed,
   a first wheel deceleration detecting means for detecting an acceleration and deceleration of said at least one wheel based on said first filtered wheel speed,
   a vehicle body speed estimating means for estimating a vehicle body speed on the basis of said first filtered wheel speed,
   a slip quantity calculating means for calculating a slip quantity on the basis of said vehicle body speed and said first filtered wheel speed,
   a second filter circuit having a cut-off frequency which is variable with respect to said wheel speed for filtering said wheel speed and producing a second filtered wheel speed,
   a second wheel deceleration detecting means for detecting an acceleration and deceleration of said at least one wheel based on said second filtered wheel speed,
   a cut-off frequency changing means for changing said cut-off frequency of said second filter circuit in accordance with a state of road surface μ, said state of road surface μ being estimated on the basis of an output of said first wheel deceleration and an output of said slip quantity calculating means,
   a control quantity calculating means for calculating and outputting a pressure reduction quantity signal at the time of detecting the wheel locking on the basis of the logical product of said output of said first wheel deceleration detecting means and an output of said second wheel deceleration detecting means or an output of said slip quantity calculating means, and
   a braking force adjusting means for adjusting the braking force of said at least one wheel in accordance with said pressure reduction quantity signal such that said braking force is decreased to avoid wheel locking and is increased when said wheel speed is restored.

2. The antiskid apparatus according to claim 1, wherein the first wheel deceleration $V_{sn}$ is calculated according to a formula $V_{sn}=V_{sn-1}+L(V_n-V_{sn-1})$, wherein $V_{sn-1}$ is a wheel speed obtained in the control period at L is a filter coefficient of said first filter circuit, $V_n$ is a wheel speed, and the second wheel deceleration $V_{Fn}$ is calculated according to a formula $V_{Fn}=V_{Fn-1}+A(V_n-V_{Fn-1})$, where A is a filter coefficient of said second filter circuit having a relation of $A \geq L$.

3. The antiskid apparatus according to claim 2, wherein said wheel speed $V_n$ is calculated according to the following formula:

$$V_n = K \frac{P_n - 1}{t_n - t_1}$$

wherein:
  $P_n$ is the number of pulses;
  $t_1$ is the first time of the first pulse input;
  $t_n$ is the time of the last pulse input; and
  K is a constant.

* * * * *